United States Patent [19]

Fulghum, Jr. et al.

[11] 4,140,281
[45] Feb. 20, 1979

[54] SEPARATION OF DIRT AND BARK FROM WOOD CHIPS

[75] Inventors: Oscar T. Fulghum, Jr.; Louie V. Handberry, both of Wadley; Arthur N. Rogers, Swainsboro, all of Ga.

[73] Assignee: Fulghum Industries, Inc., Wadley, Ga.

[21] Appl. No.: 681,048

[22] Filed: Apr. 28, 1976

[51] Int. Cl.² ............... B02C 21/02; B02C 23/10
[52] U.S. Cl. ...................................... 241/28; 209/3; 209/250; 209/284; 209/288; 241/40; 241/79.3; 241/101.7
[58] Field of Search ............... 241/28, 49, 50, 55, 241/56, 69, 79, 79.2, 79.3, 101.5, 101.7, 277, 281.1, 282.2, 40; 209/3, 284, 288, 295, 299, 86, 280

[56] References Cited

U.S. PATENT DOCUMENTS

| | | | |
|---|---|---|---|
| 2,389,715 | 11/1945 | Beardsley | 209/295 |
| 2,392,812 | 1/1946 | Faris et al. | 209/284 |
| 3,069,101 | 12/1962 | Wexell | 241/28 |
| 3,635,410 | 1/1972 | Smith | 241/56 |
| 3,826,437 | 7/1974 | Warren et al. | 241/101.7 |

Primary Examiner—Howard N. Goldberg
Attorney, Agent, or Firm—Cushman, Darby & Cushman

[57] ABSTRACT

In a timbering operation wherein the felled trees are fed into a chipper for conversion to chips at the timbering site the chips are fed into a trailer-mounted rotary cylindrical screen which separates the chips from dirt and fine bark particles. Preferably the chips entering the cylindrical screen are blown into engagement with an impact plate to aid in disloading particles of dirt and bark from the chips. The chipper may be mounted on the same trailer or may be a separate trailer-mounted unit.

13 Claims, 4 Drawing Figures

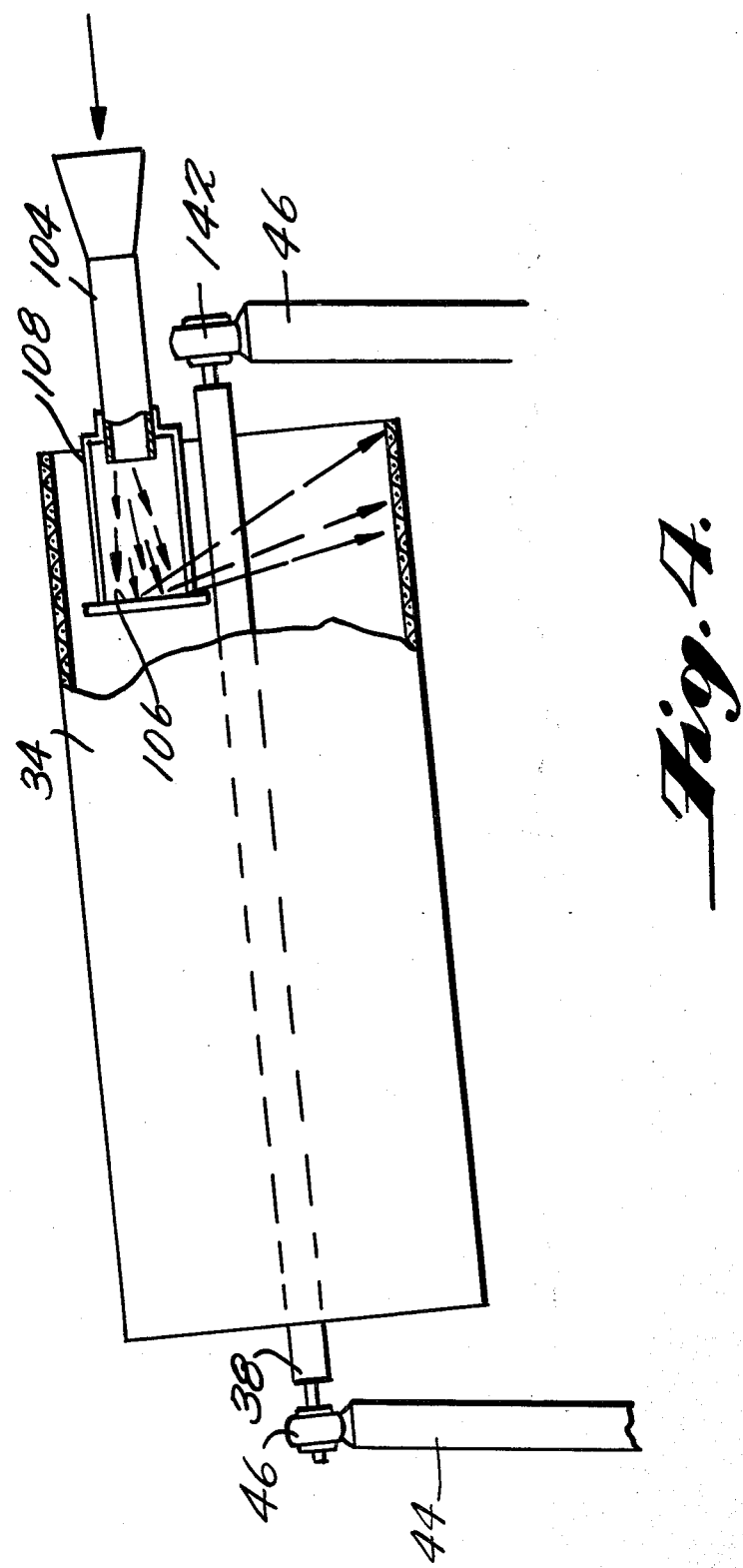

SEPARATION OF DIRT AND BARK FROM WOOD CHIPS

This invention relates to methods and apparatus for separating unwanted particles of dirt and bark from wood chips.

BACKGROUND AND SUMMARY OF THE INVENTION

In the production of wood chips it is common practice to feed whole trees and parts thereof to rotary chip-forming machines usually referred to as chippers. During the timbering operation the felled trees are often dragged along the ground for a considerable distance, and as a consequence the branches and trunk may pick up particles of dirt in the form of soil and small stones. Most of this dirt mixes with the wood chips as the latter are formed in the chipper. The wood chips are also inherently mixed with particles of bark either in loose form or bound to the chips to varying degrees.

For some purposes, such as paper making, the proportion of dirt and bark must be low, say no more than 2%. Even with care in the handling of the felled trees this limit will often be exceeded. The problem will usually be more severe when the felled trees are converted to chips at the timbering site because there is less opportunity to remove dirt from the trees under these conditions.

The present invention provides methods and apparatus which aid in the production of wood chips having a reduced content of dirt and bark.

According to one important aspect of the invention there is provided for use at a timbering site a wheeled mobile trailer, which carries a power source such as an internal combustion engine and a rotary perforated cylinder type of separator driven by the power source, the cylinder being adapted to receive a stream of wood chips from a chipper. The chipper may be mounted on the chassis and driven by the power source or it may be a separate unit brought to the site independently of the chassis. During rotation of the cylinder the solids entering at the feed location slide and roll along the rotating perforated surface presented by the wall of the cylinder. Particles of dirt and bark pass through the perforations in the wall and are collected and transferred away, as by means of one or more conveyor belts running the length of the cylinder. Movement of the solids along the rotating perforated surface presented by the wall of the cylinder is obtained by inclining the cylinder, or if desired by providing one or more continuous helical blades on the inner surface of the wall to direct the solids either unidirectionally toward one end or in opposite directions from a central feed location toward both ends. In any case, wood chips having a reduced dirt and bark content, spill or pour by gravity from one or both ends of the cylinder and are transferred to a truck or other haulage vehicle. The means for transferring the chips is preferably a chip slinger or blower having an inlet receiving the chips from the cylinder and a rotary blade mechanism for slinging the chips in the form of a continuous stream whereby the chips can be raised to the height of the body of the haulage vehicle.

According to another important aspect of the present invention the dirt and bark content of initially produced wood chips is reduced by slinging or blowing the chips against an impact surface in a manner such that particles of dirt and bark are dislodged from the chips and in a manner such that the particles and chips are deflected into a classifier which then separates the particles from the chips. When the deflector or impacter is used in conjunction with a rotary perforated cylinder type of separator such as referred above the impact surface may be the surface of a rigid plate mounted inside the cylinder. In this embodiment the chips are slung or blown in the form of a continuous stream into the cylinder through one end thereof and after striking the plate they and the dislodged dirt and bark fall by gravity to the rotating surface presented by the wall of the cylinder.

Rotary perforated cylinder type separators are, of course, known but so far as the applicants are aware such separators have not been modified and used in the manner disclosed and claimed herein for lowering the dirt and bark content of wood chips. Examples of prior perforated cylinder type separators are described in U.S. Pat. Nos. 1,677,862 (separation of sand from ceramic pieces), 1,948,606 (sorting of comminuted ores and coal), 2,303,222 (separation of dirt from onions and sorting of onions by size), 2,769,543 (separation of fibrous particles from grannular cellulose acetate) and 3,087,499 (separation of peas from hulls).

Chippers for cutting logs and branches into chips of generally uniform size are described in U.S. Pat. Nos. 3,332,461 and 3,392,763.

THE DRAWINGS

The invention will be further understood from a detailed description of several exemplary embodiments taken with the drawings in which:

FIG. 4 is a schematic view of a separator having a modified form of chip deflector.

DETAILED DESCRIPTION OF EXEMPLARY EMBODIMENTS

Figure 1:
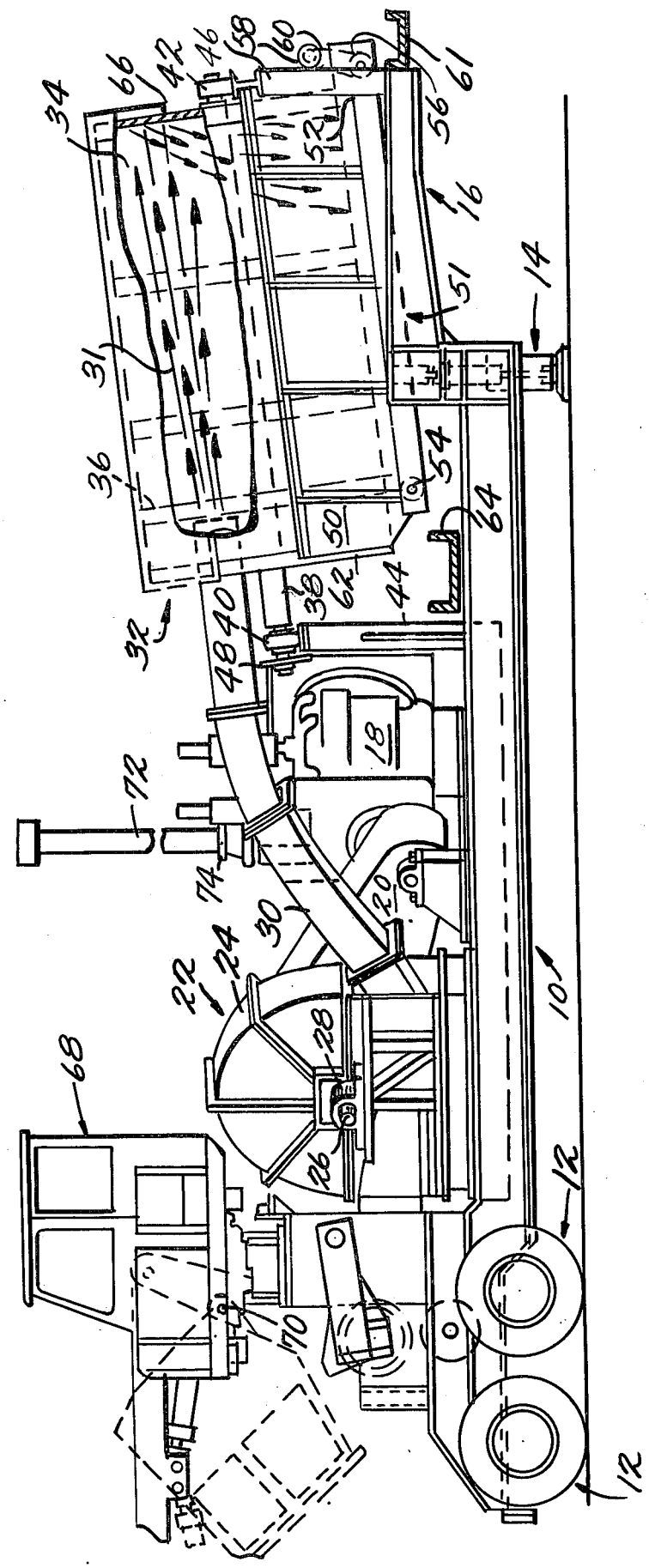
FIG. 1 is a side elevational view of a trailer-mounted chipper and separator embodying the principles of the present invention.

Referring to FIG. 1 there is shown a mobile unit which can be hauled to a timbering site to produce and clean wood chips without requiring auxiliary power equipment other than the equipment required to feed the trees to the unit. The unit includes an elongated rigid chassis 10 having ground-engaging wheels 12 at its rear end and vertically adjustable ground-engaging hydraulic jacks 14 at its front end. A conventional tongue 16 forming part of the chassis extends forwardly for connection to a towing vehicle (not shown).

Supported on the chassis 10 is a prime mover 18 such as a diesel engine and associated transmission and hydraulic pump. Drivingly connected to the prime mover 18 as by a belt or chain drive 20 is the rotor (not shown) of a chipper 22 which may be of conventional construction. The rotor, which is a disc carrying chipper blades on one face and draft inducing blades on its opposite face is enclosed in a housing 24 and is mounted for rotation in a vertical plane by means of an axle 26 supported in bearings one of which is shown at 28. Whole logs and branches arranged generally horizontally are fed in their axial directions through an opening in the lower portion of the housing 24 and into contact with the chipper blades on the rotor, the opening being located on the opposite side of the housing 24 from that shown in the drawing. The chips which are produced are of generally uniform size and are slung and/or blown out of the housing 24 through a chipper discharge pipe 30 in the form of a stream 31.

Figure 3:
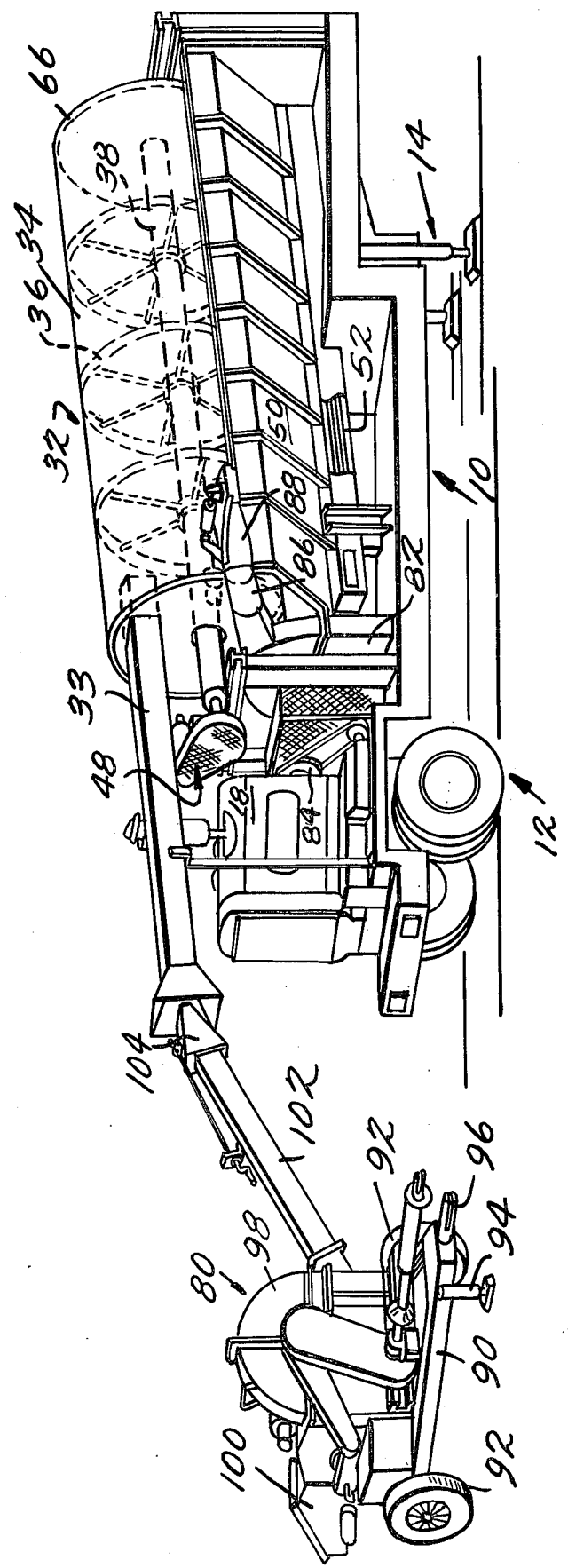
FIG. 3 is a perspective view of a trailer-mounted separator fitted with a chip slinger for discharging the cleaned chips into a truck body.

The discharge pipe 30 extends upwardly and forwardly and becomes a feed inlet pipe 33 for a separator 32 which in the illustrated embodiment is constructed as a hollow rotary perforated cylinder 34. In the illustrated embodiment the cylinder 34 may be assumed to be constructed of coarse metal screen having ⅜" apertures, the screen being supported by hoop-like members 36 which in turn are supported from a central shaft 38 by means of rigid radial arms (as shown in FIG. 3). The shaft 38 is supported at its ends for rotation about its axis by bearings 40 and 42 mounted on vertical posts 44 and 46 which are rigidly secured to the chassis 10. The shaft 38 and cylindrical wall 34 are rotatably driven by the prime mover 18 as by means of a chain drive connection 48 between the latter and the shaft 38. The arrangement is such that the axis of the cylinder 34 is inclined rearwardly and downwardly when the chassis is approximately horizontal. As indicated previously, the perforated cylinder may be horizontal and be provided with internal helical blades fixed to the cylinder so as to direct the solids toward one end or toward both ends from the middle. In the latter case the chips will be fed to the middle of the cylinder.

Partially enclosing the cylinder 34 from the sides are two stationary side walls one of which is shown at 50. Between these two side walls and directly below the cylinder 34 is a longitudinally-extending endless conveyor 51 of which the belt 52 has an upper run for collecting particles of dirt and bark which pass through the perforations in the cylinder 34. The belt 52 is looped over rollers 54 and 56 which are supported for rotation about their axes in any suitable manner, and the roller 56 is driven by a hydraulic motor 58 and chain 60, the motor 58 being hydraulically connected to the pump unit of the prime mover 18. The upper run of the belt 42 travels forwardly so as to discharge the dirt and bark particles at the front end of the apparatus. The discharged particles may be transferred to a waste area or to a haulage vehicle by one or more auxiliary conveyors, blowers or the like 61.

The chips from which dirt and bark have been separated spill or pour from the lower end 62 of the cylinder 34 and are received by a conveyor which is illustrated schematically at 64. This clean chip conveyor may be a rotary slinger or blower, such as that shown at 82 in FIG. 3, which directs the chips in an upward and laterally outward stream which can be collected directly in a truck body.

An important feature of the system illustrated in FIG. 1 is an impact plate which in conjunction with the kinetic energy of the chips passing out of the chipper discharge pipe 30, dislodges particles of dirt and bark from the chips. In the illustrated construction the plate is a rigid circular plate 66 closing the upper end of the cylinder 34. Conveniently the plate 66 forms part of the supporting structure of the cylinder and is connected to the shaft 38 for rotation therewith. The stream 31 of chips is projected out of the chipper discharge pipe 30 with sufficient velocity that the chips are carried to the upper end of the cylinder where they impinge on the plate 66 and are deflected downwardly onto the rotating perforated surface presented by the cylinder 34. The impact of the chips on the plate 66 dislodges particles of dirt and bark from the chips, these particles also falling into the mass of chips being rolled in the cylinder 34.

The chassis 10 also carries an operator's cab 68 from which the operation of the chipper 22, separator 32 and other machinery may be controlled. The cab 68 is mounted for pivotal movement about a horizontal axle 70 which is transverse to the chassis 10. As shown in dotted lines the cab 68 can be tilted forward to lower the profile of the system when being towed on the roadways. The exhaust stack 72 for the engine may also be hinged as at 74 to lower the profile of the system.

In operation of the system of FIG. 1 the chassis 10 is towed to a timbering site, disconnected from its towing vehicle and leveled with the hydraulic jacks 14. The chipper 22 and the separator 32 are placed in operation by the prime mover 18 and whole logs or branches are fed into the chipper 22 by means of conventioonal tree-handling equipment (not shown). The felled trees will normally be dragged along the ground from where they were cut to the chipper 22 and will unavoidably become contaminated with dirt. The chipper 22 reduces the trees to chips which, together with the unavoidable dirt and bark particles, pass in a continuous stream 31 at rather high velocity through the discharge pipe 30 and into the lower end of the separator cylinder 34. The momentum of the chips carries them to the upper end of the cylinder where they strike the plate 66 thereby causing much of the adhered dirt and bark to be dislodged from the wood. The chips and dislodged particles fall to the rotating perforated surface presented by the cylinder 34 and then roll and slide toward the lower end 62 of the cylinder 34. The loosened particles of dirt and bark pass through the perforations onto the upper run of the belt 52 and are carried by the latter to the forward end of the chassis 10 where they are discharged directly to waste or to an auxiliary conveyor (not shown). The wood chips continue to move along the rotating surface and fall by gravity out of the lower end 62 of the cylinder 34 into any desired form of transfer means 64. As described above, a particularly useful transfer means is a rotary chip slinger or blower which can transfer the chips into the bed of a truck (not shown) for hauling to a processing site.

Figure 2:
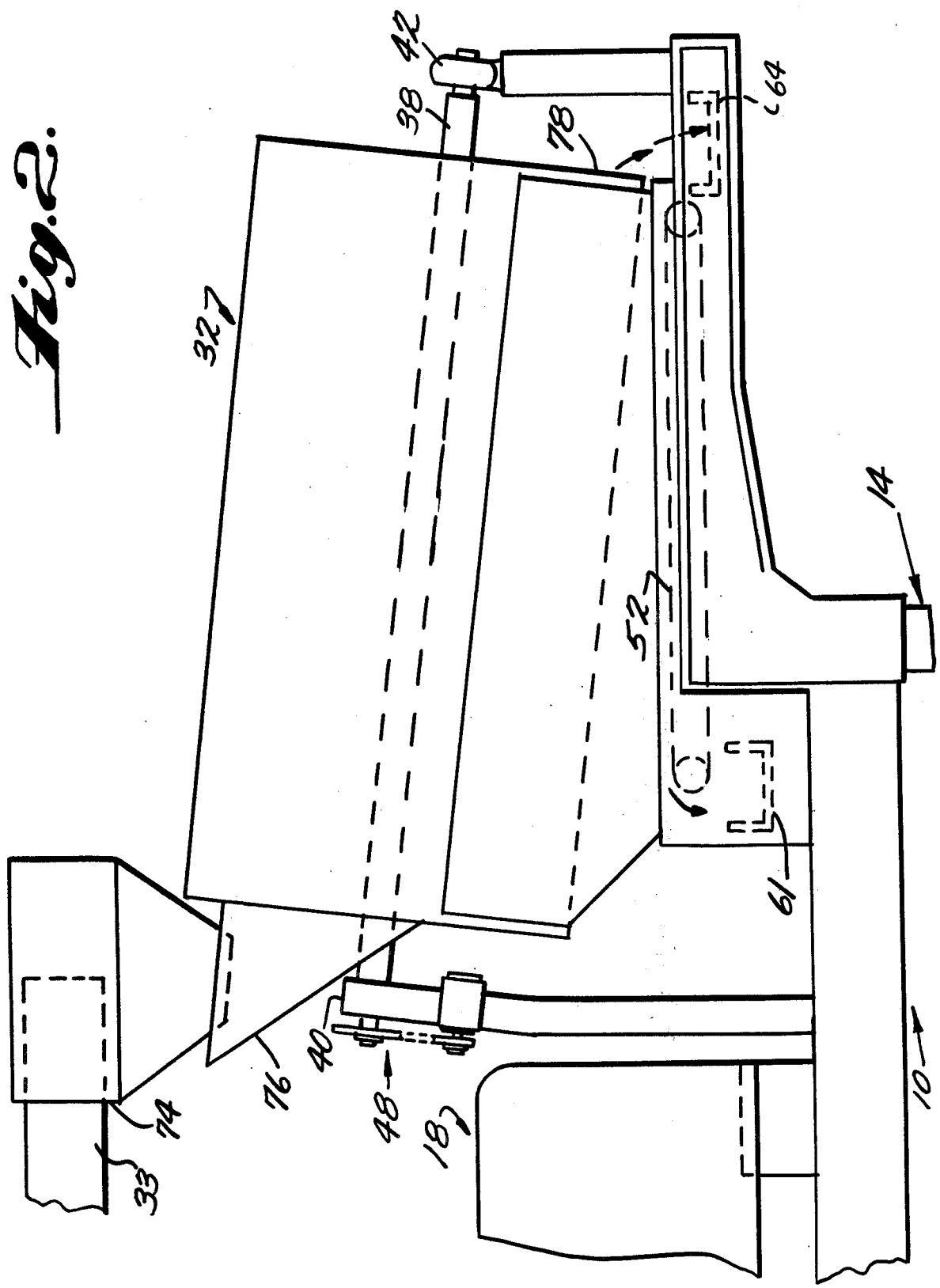
FIG. 2 is a partial side elevational view of a trailer-mounted separator having a different form of inlet from that of FIG. 1.

FIG. 2 illustrates a somewhat different arrangement of a rotary cylindrical separator 32 on a chassis 10. In this arrangement the perforated cylinder 34 is so inclined that its lower end is at the front of the chassis. The separator inlet pipe 33 discharges its chips into a hopper 74 from which the chips pass to a chute 76 and then into the upper end of the cylinder 34. No impact plate for dislodging dirt and bark from the chips is used in this embodiment. That dirt and bark which is separated from the wood passes through the perforations in the cylinder 34 and is carried forwardly by the conveyor belt 52 for discharge to the auxiliary transfer means 61. The chips are discharged at the lower forward end 78 of the cylinder 34 into the auxiliary transfer means 64.

FIG. 3 illustrates a system in which a separate mobile chipper 80 is used in conjunction with the trailer-mounted rotary separator 32. The trailer unit of this arrangement includes all of the elements of FIG. 1 except a chipper and therefore no detailed description is necessary. The chips, after separation from the dirt and bark, are discharged from the cylinder 34 into a blower 82 which is drivingly connected to the prime mover 18 at 84. The blower 82 is provided with a discharge pipe 86 which has an adustable outlet deflector 88 for directing the chips into a truck bed (not shown).

The separate mobile chipper 80 may be of conventional construction. As shown, it includes a frame 90 having wheels 92, a leveling leg 94 and a towing connection 96. The rotor of the chipper is enclosed in a housing 98 having an inlet chute 100 through which trees and branches are introduced. An outlet chute 102 having an adjustable deflector 104 at its upper end directs the chips into the separator inlet pipe 33.

FIG. 4 is a simplified schematic elevational view of a different arrangement of a chip impact plate in conjunction with a rotary perforated separator cylnder 34. In this arrangement there is a separator feed pipe 104 projecting into the upper end of the inclined cylinder 34. The impact plate 106 is a relatively small stationary plate axially spaced from but rather close to the end of the pipe 104. The plate 106 may be supported by brackets 108 which are fixed to the feed pipe 104. The chips being blown out of the feed pipe 104 strike the impact plate 106, rebound and then fall downwardly to be acted on by the perforated cylinder 34 as in the other embodiments.

What is claimed is:

1. In a method of conducting a timbering operation wherein trees are felled and converted to wood chips at the timbering site by being fed to a rotary chipper from which wood chips are slung and blown in the form of a continuous stream, the steps of feeding the wood chips being discharged from the chipper to the interior of a rotating cylindrical separator having a perforated wall, continuously discharging dirt particles and fine bark particles in a downward direction through the perforations in the wall of the rotating separator, transferring the discharged dirt and bark away from the lower surface of the separator, continuously discharging a stream of wood chips relatively free of loose particles of dirt and bark from at least one end of the rotating separator, and continuously transferring the stream of wood chips to a haulage vehicle for removal from the site.

2. A method as in claim 1 including the step of impacting the stream of chips from the chipper against a rigid surface before the chips are acted on by the rotating cylindrical separator in order to dislodge dirt and bark particles from the wood.

3. A method of removing particles of dirt and bark from a mixture containing the same and containing wood chips obtained by reducing whole trees or parts thereof to chip form, said method comprising depositing a continuous stream of the mixture in a cylindrical separator which is rotating about its axis, said separator having a side wall perforated with apertures sized to pass particles of dirt and bark and to prevent passage of the wood chips, discharging dirt and bark particles downwardly through the apertures and transferring the discharged particles away from the separator, continuously discharging a stream of wood chips relatively free of particles of dirt and bark from the separator, and continuously transferring the wood chips away from the separator.

4. A method as in claim 3 wherein the mixture of wood chips and particles of dirt and bark is deposited in the rotating separator by dispersing the mixture in a stream of air and directing the resulting stream of dispersed solids into the separator.

5. A method as in claim 4 including the step of impinging the stream of dispersed solids onto an impact surface to dislodge particles of dirt and bark from the wood chips before the same engage the perforated side wall.

6. A method as in claim 5 wherein the separator is inclined and wherein the impinging step is carried out in the upper end of the inclined separator.

7. A method of removing particles of dirt and bark from a mixture of the same with coarser wood chips obtained by reducing whole trees or parts thereof to chip form, said method comprising dispersing the mixture in a stream of gas, impinging the resulting stream of dispersed solids onto an impact surface to dislodge particles of dirt and bark from the wood chips and thereafter subjecting the solids to a classifying operation which separates the finer particles of dirt and bark from the coarser wood chips.

8. A method as in claim 7, wherein said classifying operation includes a screening step in which the finer particles pass through apertures which are too small to permit passage of the wood chips.

9. Apparatus for use in a timbering operation wherein trees are felled and converted to wood chips at the timbering site, said apparatus comprising an elongated mobile chassis having ground-engaging wheels at least at one end, a chipper mounted on the chassis for reducing trees and parts thereof to wood chips slung and blown from the chipper in the form of a stream, a hollow cylindrical separator having a side wall perforated with apertures sized to pass fine particles of dirt and bark and to retain the coarser wood chips, said separator being mounted on the chassis for rotation about the axis of the separator, said separator and chipper being arranged such that the stream of wood chips from chipper is directed into the interior of the separator, power means mounted on the chassis for driving the chipper and for rotating the separator, chip transfer means for transferring a stream of chips from the chipper to the cylindrical separator, means underneath the separator for continuously collecting particles of dirt and bark which pass through the perforated wall and for transferring the particles away from the separator, and means adjacent at least one end of the separator for collecting and transferring away wood chips being discharged from said end.

10. Apparatus as in claim 9 including an impact plate in said cylindrical separator located such that the stream of chips from the chipper impinge on said plate after entering the separator.

11. Apparatus for use in a timbering operation wherein trees are felled and converted to wood chips at the timbering site by means of a chipper from which wood chips are slung and blown in the form of a stream, said apparatus comprising a mobile chassis having ground-engaging wheels at least at one end thereof, a hollow cylindrical separator for receiving thereinto the stream of wood chips from the chipper, said separator having a side wall perforated with apertures sized to pass fine particles of dirt and bark and to retain coarser wood chips, means mounting said separator on said chassis for rotation about the axis of the separator, an engine mounted on said chassis and drivingly connected to said separator to rotate the latter, first transfer means mounted on said chassis underneath said separator for collecting particles of dirt and bark discharged through the side wall of said separator and for transferring such particles away from said separator, and second transfer means mounted on said chassis adjacent at least one end of said separator for receiving wood chips being discharged from said end and for transferring the chips away from said separator.

12. Apparatus as in claim 11 wherein said second transfer means includes a blower for dispersing the wood chips in a stream of air and for directing the resulting stream of dispersed chips away from said separator.

13. Apparatus as in claim 11 including a feed pipe for introducing a stream of air in which chips are dispersed into said separator and an impact surface disposed in said separator in the path of the entering stream of air and chips, said impact surface being struck by the stream and causing particles of dirt and bark to be dislodged from the wood chips and deflecting the latter to drop by gravity into engagement with the side wall of the separator.

* * * * *